(12) United States Patent
Adams et al.

(10) Patent No.: US 6,874,272 B1
(45) Date of Patent: Apr. 5, 2005

(54) FISHING SINKER

(75) Inventors: Nicholas S. Adams, East Gull Lake, MN (US); Ronald J. Linder, Baxter, MN (US)

(73) Assignee: Lindy Little Joe, Inc., Brainerd, MN (US)

( * ) Notice: Subject to any disclaimer, the term of this patent is extended or adjusted under 35 U.S.C. 154(b) by 0 days.

(21) Appl. No.: 09/579,285

(22) Filed: May 30, 2000

Related U.S. Application Data

(63) Continuation-in-part of application No. 09/337,155, filed on Jun. 21, 1999, now Pat. No. 6,145,240.

(60) Provisional application No. 60/135,022, filed on May 20, 1999.

(51) Int. Cl.[7] .................. A01K 95/00; A01K 85/01
(52) U.S. Cl. .................... 43/44.96; 43/42.31
(58) Field of Search ................ 43/43.1, 43.14, 43/42.31, 44.96, 44.97

(56) References Cited

U.S. PATENT DOCUMENTS

| | | | |
|---|---|---|---|
| 12,060 A | 12/1854 | Hoard | 43/43.14 |
| 1,858,550 A | 5/1932 | Kahle | 43/43.14 |
| 2,589,715 A | 3/1952 | Lysikowski | 43/43.14 |
| 2,600,002 A | 6/1952 | Klein | 43/43.14 |
| 2,940,207 A | 6/1960 | Scott | 43/43.13 |
| 3,012,359 A | 12/1961 | Foster | 43/43.14 |
| 3,102,359 A * | 9/1963 | Cahill et al. | 43/43.14 |
| 3,466,788 A * | 9/1969 | Potter | 43/44.97 |
| 3,468,053 A * | 9/1969 | Lux | 43/42.31 |
| 3,670,447 A * | 6/1972 | Wohead | 43/43.14 |
| 3,672,088 A | 6/1972 | Sells | 43/44.11 |
| 3,736,690 A * | 6/1973 | Witkowski | 43/43.14 |
| 3,852,906 A | 12/1974 | LaForce | 43/43.14 |
| 4,242,827 A * | 1/1981 | Smith | 43/42.1 |
| 4,428,144 A | 1/1984 | Dickinson | 43/44.96 |
| 4,649,662 A * | 3/1987 | Tharp et al. | 43/43.14 |
| 4,679,349 A * | 7/1987 | Birchfield | 43/44.97 |
| 4,693,030 A | 9/1987 | Wohead | 43/42.22 |
| 4,727,676 A * | 3/1988 | Runyan | 43/43.1 |
| 4,744,169 A * | 5/1988 | Nochta | 43/42.31 |
| 4,750,289 A | 6/1988 | Rossa | 43/44.96 |
| 4,930,247 A * | 6/1990 | Dubois | 43/42.31 |
| 4,964,236 A * | 10/1990 | Adams | 43/44.92 |
| 4,965,956 A * | 10/1990 | Bethel | 43/43.1 |
| 5,144,765 A * | 9/1992 | Keeton | 43/42.31 |
| 5,253,447 A | 10/1993 | Rhinehart | 43/42.14 |
| 5,303,499 A | 4/1994 | Miller | 43/43.15 |

(Continued)

FOREIGN PATENT DOCUMENTS

JP 5-284886 B1 * 11/1993

(Continued)

OTHER PUBLICATIONS

Product Advertisement, 1999 Lindy No-Snagg Slip Sinker.

*Primary Examiner*—Darren W. Ark
(74) *Attorney, Agent, or Firm*—Dorsey & Whitney LLP

(57) ABSTRACT

A unitary fishing sinker having a body with a buoyant portion having a density less than water and a weighted portion with a density greater than water. A further feature of the invention includes an elongated sinker body formed on a central wire with a line connection member at one end and a distal end extending outwardly from the body. The invention also relates to a method of making the above sinker.

18 Claims, 5 Drawing Sheets

U.S. PATENT DOCUMENTS

| | | | |
|---|---|---|---|
| 5,428,919 A * | 7/1995 | Enomoto | 43/42.31 |
| 5,926,995 A * | 7/1999 | Dubois | 43/42.31 |
| 5,946,847 A * | 9/1999 | North | 43/42.31 |
| 6,145,240 A * | 11/2000 | Adams et al. | 43/44.96 |
| 6,155,000 A * | 12/2000 | Ravencroft | 43/42.31 |
| 6,305,121 B1 * | 10/2001 | Adams et al. | 43/44.96 |
| 6,510,646 B1 * | 1/2003 | Kechriotis | 43/42.31 |

FOREIGN PATENT DOCUMENTS

| | | | |
|---|---|---|---|
| JP | 8-19358 B1 * | 1/1996 |
| JP | 10-248460 B1 * | 9/1998 |
| JP | 11-225638 B1 * | 8/1999 |
| JP | 2000-175605 B1 * | 6/2000 |
| JP | 2000-253787 B1 * | 9/2000 |

* cited by examiner

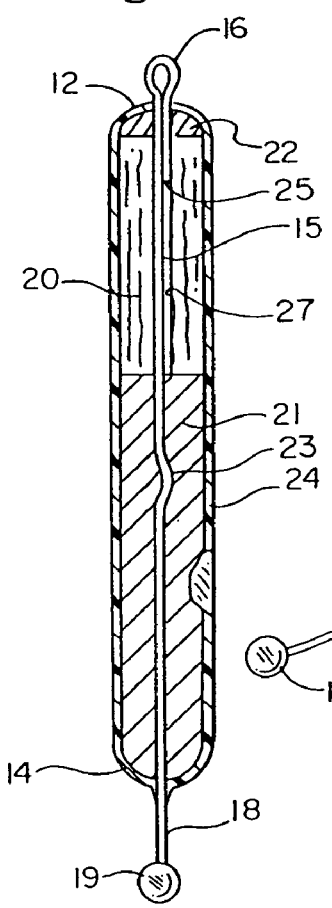
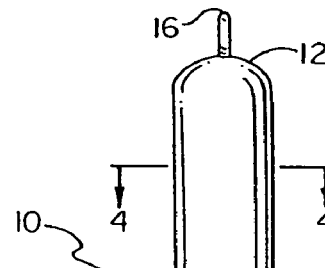
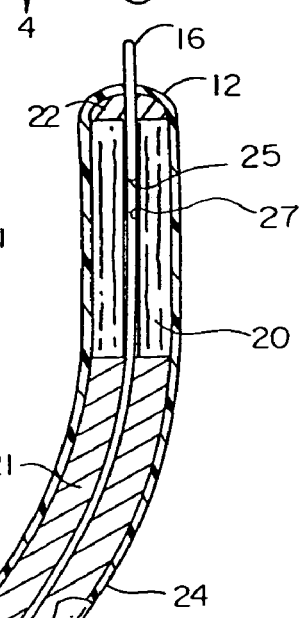
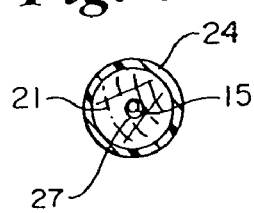
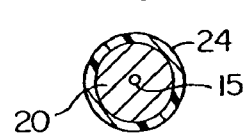

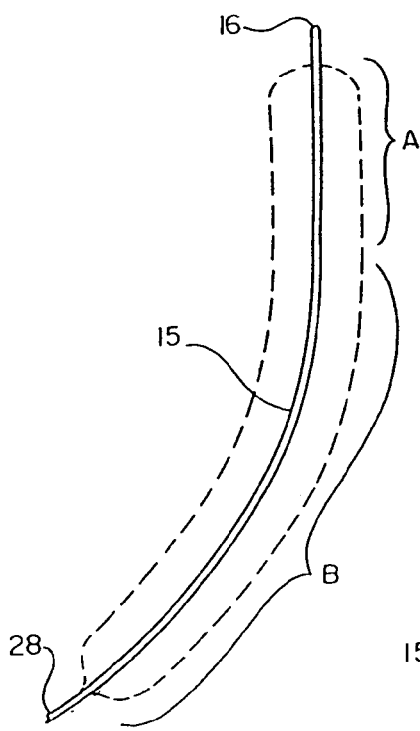
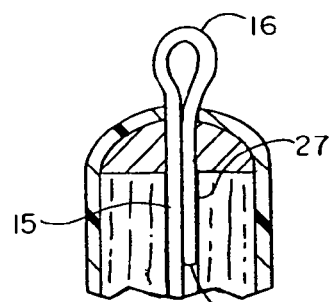
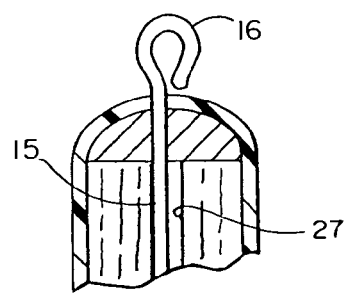
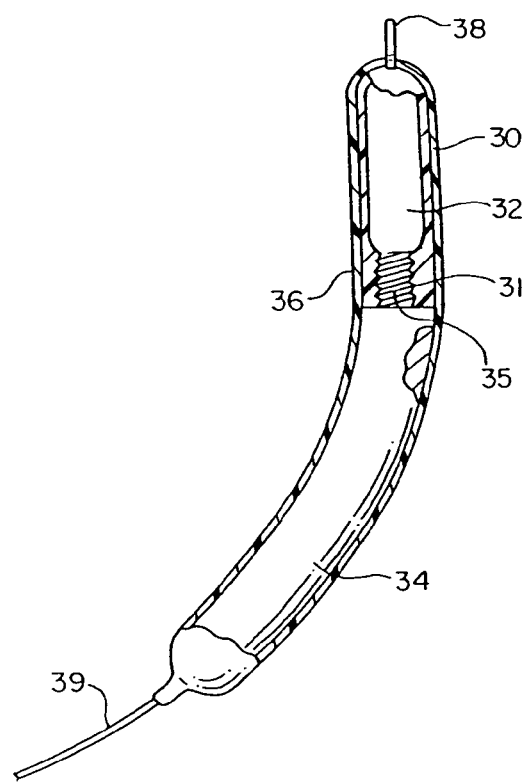

Fig. 11
Fig. 12
Fig. 13
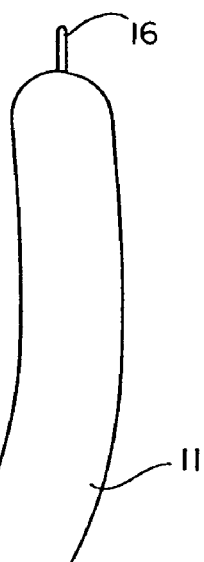
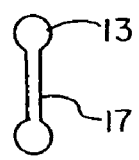
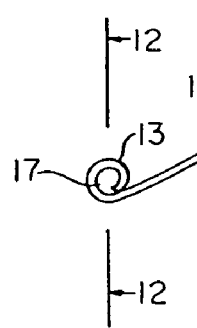
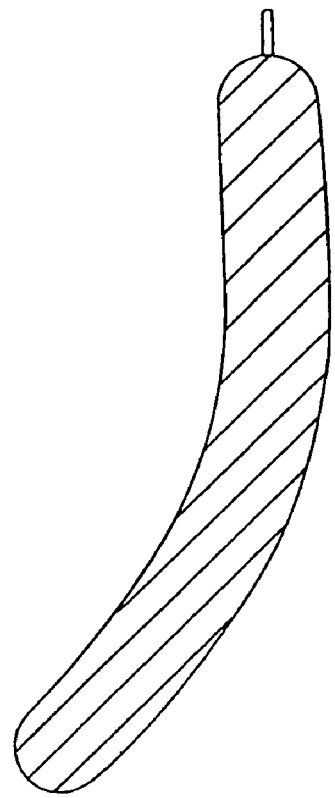

FISHING SINKER

This application is a continuation-in-part of Non-provisional application Ser. No. 09/337,155 filed Jun. 21, 1999 now U.S. Pat. No. 6,145,240 which claims benefit of 60/135,022 filed May 20, 1999.

BACKGROUND OF THE INVENTION

1. Field of the Invention

The present invention relates generally to a fishing sinker and a method of making the same, and more specifically to a fishing sinker with a configuration which enables the sinker to be substantially snag-free while at the same time providing desired action to the bait or trailing snell and providing the angler with a better feel of the bottom. The invention also relates to a method of making such a fishing sinker.

2. Description of the Prior Art

A variety of fishing sinkers or weights currently exist in the art. These sinkers function primarily to provide weight to a fishing line for the purpose of causing the fishing line and the attached bait or lure to sink below the water surface. A variety of sinker configurations exist. Some sinkers are designed for attachment to the fishing line at a fixed position. Others, commonly referred to as slip sinkers, are allowed to slip or slide along the fishing line within certain limits. For the most part, these sinkers are constructed of a heavy metal or other material to provide sinker with the necessary weight. Lead or lead alloys are materials commonly used in the manufacture of currently available fishing sinkers. Some, however, such as the sinkers of the LaForce Pat. No. 3,852,906, the Wohead Pat. No. 4,693,030, the Foster Pat. No. 3,012,359 and the Miller Pat. No. 5,303,499 disclose sinkers with buoyant capability.

Although the current fishing sinkers adequately provide the function of causing the fishing line and attached bait or lure to sink below the water surface as desired, the sinkers of the prior art comprise multiple parts and/or often become snagged or hung up, particularly in fishing areas with rocks, brush, weed beds or stump fields. As a result, many of these snag infested fishing waters are considered "off limits" with certain conventional sinkers.

Accordingly, there is need in the art for a new fishing sinker which is of a substantially unitary structure and is substantially snag-free or which substantially reduces the frequency of the sinker from becoming snagged in rocks, brush, weed beds, stump fields and the like. A need also exists for a method of making such a fishing sinker.

SUMMARY OF THE INVENTION

In contrast to the prior art, the fishing sinker of the present invention has a construction and configuration which is substantially unitary, which makes it substantially snag-free, which provides the angler with a better feel of the bottom and which glides through the water without tumbling or twisting, while still providing a desired degree of wobble or action to the bait or trailing snell.

More specifically, the fishing sinker of the present invention includes a substantially unitary body with a fishing line connection member in which the body comprises a weighted portion having a density greater than water and a buoyant portion having a density less than that of water. In a preferred construction, the body is elongated and is provided with a fishing line connection end and an opposite free end. Preferably the buoyant portion of the body is positioned near the connection end so that when the sinker is immersed in water, the connection end is more buoyant than the free end.

A further feature of the fishing sinker of the present invention is to provide the sinker body with an elongated generally central stem such as a wire with a fishing line connection portion at one end. In a preferred embodiment, the centrally located stem or wire extends through the entire length of the sinker body and outwardly from the free end for a limited distance. During use, the distal end of the wire rides along the bottom, thereby providing the angler with a better feel at the bottom and permitting the sinker to pivot and shake itself loose from rocks, weeds, brush and other snags in a manner significantly improved from sinkers of the prior art.

Preferably, the elongated configuration of the sinker of the present invention is curved or includes a curved portion which, either individually or in combination with the buoyant portion of the body and/or the outwardly extending wire, increases the snag resistant ability of the sinker of the present invention. With the curved configuration and the buoyant weighted portion balance of the sinker of the present invention, the sinker tends to lift, pivot and right itself as it wiggles through over and around snags, while at the same time preventing the sinker from flopping or tumbling during a cast and from spinning or twisting during use.

The method aspect of the present invention relates to a method of making the sinker of the present invention and includes the step of providing a preformed wire of predetermined length with a fishing line connection loop at one end. This is followed by applying a buoyant portion of the body near the connection loop and then molding the weighted portion to the wire adjacent to the buoyant portion. In a preferred embodiment of the present invention, a short weighted portion is also molded to the top or line connection end of the body to assist in anchoring the line connection end of the wire to the body and to prevent water from reaching the buoyant portion.

Accordingly, it is an object of the present invention to provide a fishing sinker which is substantially snag-free or which substantially reduces snags in comparison to sinkers of the prior art.

Another object of the present invention is to provide a fishing sinker having a substantially unitary body with a buoyant portion having a density less than that of water and a weighted portion having a density greater than that of water.

Another object of the present invention is to provide a fishing sinker with a body formed or molded around an elongated wire, with such wire having a fishing line connection end and a distal end extending outwardly from the sinker body.

A still further object of the present invention is to provide a fishing sinker with an elongated, curved body.

A still further object of the present invention is to provide a fishing sinker with a noise creating portion.

Another object of the present invention is to provide a method of making the fishing sinker described above.

These and other objects of the present invention will become apparent with reference to the drawings, the description of the preferred embodiment and the appended claims.

DESCRIPTION OF THE DRAWINGS

FIG. 1 is an elevational side view of the fishing sinker of the present invention.

FIG. 2 is a view, partially in section, as cut along the center axis of the sinker of the present invention as viewed from the same direction as that of FIG. 1.

FIG. 3 is a view, partially in section, of the fishing sinker of the present invention as viewed along the section line 3—3 of FIG. 1.

FIG. 4 is a view; partially in section, as viewed along the section line 4—4 of FIG. 1.

FIG. 5 is a view, partially in section, as viewed along the section line 5—5 of FIG. 1.

FIG. 6 is a side elevational view of a preformed wire of predetermined length and configuration used in the construction of the fishing sinker of the present invention, with the sinker body shown in phantom.

FIG. 7 is an enlarged view of the top or line connection end of the preformed wire prior to manufacture of the fishing sinker of the present invention, with a portion of the sinker body shown in phantom.

FIG. 9 is an enlarged view of an alternate embodiment of the top or line connection end of the preformed wire, with a portion of the sinker body shown in phantom.

FIG. 10 is a side view, partially in section, of an alternate embodiment of the sinker of the present invention.

FIG. 11 is an enlarged view of an alternate embodiment for the bead at the end of the wire.

FIG. 12 is a view, partially in section, as viewed along the section line 12—12 of FIG. 11.

FIG. 13 is a sectional view, similar to that of FIG. 2, showing an alternate embodiment of the sinker of the present invention.

DESCRIPTION OF THE PREFERRED EMBODIMENT

Figure 8:
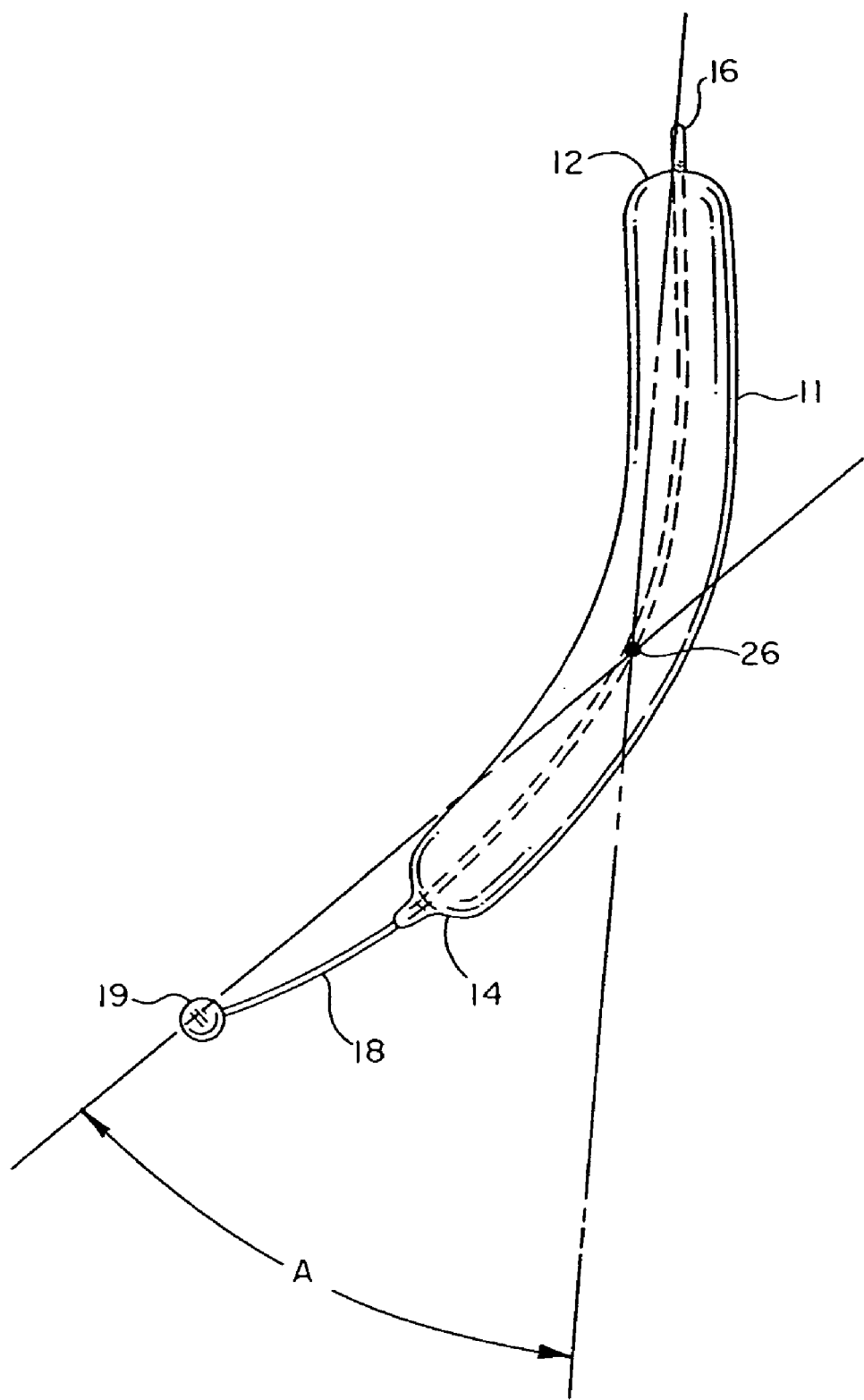
FIG. 8 is a side elevational view of the lure of the present invention with the central wire shown in phantom and showing the angle defining the preferred curvature or bend in the fishing sinker of the present invention.

With reference to FIG. 1, the fishing sinker 10 of the present invention includes an elongated, banana-shaped body 11 having a fishing line connection end 12 and a free end 14. Extending from the connection end 12 of the body 11 is a fishing line connection member 16. As will be described below, the fishing line connection member 16 of the preferred embodiment comprises a loop formed at the end of a wire embedded in the body 11, however, the line connection member 16 can include a variety of other known connection embodiments as well including the provision of various forms of eyelets and swivels or a hole or eyelet formed or molded directly in the top or line connection end 12 of the body 11.

A wire or stem portion 18 extends outwardly from the free end 14 of the body 11 for a limited distance. In the preferred embodiment, a bead 19 is provided at the distal end of the wire 18. Preferably, the bead 19 is a glass bead, although it can also be constructed of materials such as plastic or metal, among others. During use, the distal end of the wire portion 18 and/or the bead 19 are dragged along the lake or river bottom providing the user with a better feel or sensitivity of the bottom. The extended wire 18 also helps provide balance to the sinker and assists in keeping the body portion 11 off the bottom during use to reduce snags and hangups. Preferably, the wire portion 18 is about 10 to 80% of the body length and more preferably is about 15 to 75% of the body length.

An alternative to the bead 19 is to provide the distal end of the wire 18 with a curved or looped portion 13 as shown in FIGS. 11 and 12. Preferably the loop 13 at the end of the wire 18 lies in the same plane as the plane in which the curved sinker body lies. With this alternate structure, a web 17 of coating material is formed across the loop 13 as shown when the coating material is applied as discussed below.

In the preferred embodiment, the body 11 is elongated and has a substantially center axis extending from a first or line connection end 12 to a second or free end 14. The body 11 is elongated in the direction of the center axis and includes a length dimension measured from the connection end 12 to the free end 14 along the center axis and a width dimension measured in a direction perpendicular to the center axis and at a point about midway between the connection and free ends. The cross-sectional configuration and width dimension of the body 11 can vary along the length of the body, however, in the preferred embodiment, the cross-sectional configuration is substantially circular as shown in FIGS. 4 and 5, and is substantially consistent or the same throughout substantially the entire length of the body. Preferably, the body 11 has an elongation such that the length dimension is at least about three times the width dimension, more preferably at least about five times the width dimension and most preferably about 5 to 15 times the width dimension.

The sinker in accordance with the present invention has particular application to lake and river fishing in which the sinker has a weight less than 10 oz. and more preferably less than about 5 oz. The length dimension of such a sinker is preferably less than about 15 inches, more preferably less than about 10 inches and most preferably less than about 5 inches. The preferred width dimension of the sinker of the present invention is less than about one inch and more preferably less than about one-half inch.

Although some improvement in snag resistance is experienced by a body 11 which is substantially straight, improved snag resistance is experienced when the elongated body 11 is provided with a bend or curvature as shown in FIGS. 1, 8, 10 and 13. Such a bend or curvature enables the sinker to twist itself free from obstructions and enables the sinker to glide through the water without tumbling or twisting, while at the same time providing the bait or the trailing snell with a desired degree of wobble.

As illustrated best in FIG. 8, the curvature or bend of the body 11 is defined best by the angle "A". One leg 23 of this angle comprises an extension of a line extending through the line connection member 16 and the midpoint 26, while the other leg 27 of this angle comprises a line extending through the midpoint 26 and the distal end of the wire 18. In FIG. 8, the midpoint 26 is a point along the center axis of the body 11 which is approximately midway between the line connection member 16 and the bead 19. If the sinker does not include the outwardly extending wire 18, the midpoint 26 for purposes of determining the angle "A", and thus the curvature of the body, is the point along the center axis of the body which is approximately midway between the member 16 and the free end 14. The legs of the angle "A" in this latter embodiment comprise the extension of a line extending between the connection member 16 and the midpoint 26 and a line extending between the midpoint 26 and the free end 14. The angle "A" in either embodiment should preferably be less than 75°, more preferably between about 5° and 60° and most preferably between about 10° and 50°. If the angle "A" is too large, the balance of the sinker can be adversely affected. This can result in flopping or tumbling of the sinker during a cast and diminished control of the sinker as it is dragged along the lake or river bottom. If the angle "A" is too small, the sinker is more prone to snagging and tends to spin or twist as it is dragged along the bottom.

The exposed wire portion 18 extending outwardly from the free end 14 of the sinker body 11 provides the angler with an improved feel or sensitivity of the lake or river bottom which the sinker is crossing. Further, the wire portion 18 together with the overall curvature of the sinker, improves the balance of the sinker during use by increasing the sinker length without increasing the weight, and assists in keeping the sinker stable during casting and out of crevices and the like. during use.

The specific structure of the sinker of the present invention is shown best in FIGS. 2, 3, 4 and 5. As shown, the body 11 includes a buoyant portion 20 having a density less than that of water and a weighted portion 21 having a density greater than that of water. In the preferred embodiment, the buoyant portion 20 is positioned at or near the connection end 12 of the body, while the weighted portion 21 is positioned at or near the free end of 14 of the body. The volume or amount of the buoyant portion 20 compared to that of the weighted portion 21 assists in defining the balance of the sinker in accordance with the present invention. Preferably, the buoyant portion 20 comprises about 10 to 60% of the volume of the body 11, more preferably about 15 to 50% of the volume of the body 11 and most preferably about 20 to 40% of the volume of the body 11.

Although the buoyant portion 20 can extend to and define the connection end 12 of the body 11, the preferred embodiment includes a short, weighted portion 22 positioned at the connection end 12 and having a density greater than that of water. Preferably, the weighted portion 22 and the weighted portion 21 are constructed of the same material. In the preferred embodiment, the weighted portion 22 functions primarily to anchor and stabilize the attachment member 16 and the central wire 15 and to prevent water from reaching the buoyant portion 20. In the preferred embodiment, the weighted portion 22 extends downwardly from the connection end 12 no more than about ⅛ inch.

The buoyant portion 20 can be constructed of a variety of buoyant materials as long as the material has a density less than that of water, and is thus buoyant. Various solid materials such as styrofoam or other plastics can be used; however, the material of the preferred embodiment is balsa. The buoyant portion 20 may also be provided in the form of an air bubble or air chamber which is sealed and thus provides the necessary buoyancy, as shown in the embodiment of FIG. 10 described below.

The weighted portion 21 and the weighted portion 22 can also be constructed of a variety of materials, providing such materials have a density greater than that of water. Preferably, the material is a heavy metal such as lead, lead alloys or antimony/lead. In the preferred embodiment, the buoyant portion 20 and weighted portions 21 and 22 are fixed to one another to form a rigid, unitary structure and thus are not capable of being detached from one another. Further, the weight of the sinker is fixed and not capable of being varied.

The existence of the buoyant portion 20 relative to the weighted portion 21 provides a lift to the sinker body 11 when the sinker encounters an obstruction. Preferably, the buoyant portion 20 is not sufficient to provide the sinker with a generally vertical orientation when placed in the water. However, the buoyant portion 20 is sufficient to provide an upward or lifting force to the top part of the sinker when it is in the water. Accordingly, when pulled or jerked, the sinker is lifted upwardly and forwardly by the fishing line. With an optimum balance between buoyant and weighted material in the sinker as described above, improved snag resistance is achieved.

With continued reference to FIGS. 2–4, the sinker is provided with an elongated stem or wire 15 extending through the body 11 substantially along its center axis. In the preferred embodiment, the member 15 is a stainless steel wire of approximately 0.010 to 0.100 inches in diameter. As used herein, unless otherwise stated, the term "wire" means any elongated, thin stem portion with functions in the manner disclosed herein. As shown best in FIGS. 3 and 7 this wire 15 is provided with a fishing line connection member or eyelet 16 at one end. In the preferred embodiment, the connection member 16 is formed by bending an end of the wire 15 to form a loop, with an end 25 extending downwardly a limited distance. The wire 15 extends from the member 16 through the entire length of the body 11 and past the free end 14 of the body to form the outwardly extending portion 18. The outwardly extending portion 18 includes a distal end provided with the bead 19. Preferably, the end 25 is long enough to extend a limited distance into the hole 27 of the portion 20. As shown best in FIGS. 2 and 3, the eyelet 16 lies in a plane which is substantially perpendicular to the plane in which the curved wire 15 lies. The central portion of the wire 15 includes a humped or kinked portion 23 (FIG. 3) to prevent the molded weighted portion 21 from slipping or twisting relative to the wire 15.

In the preferred embodiment, the entire body 11 is dip coated or otherwise provided with a plastic coating 24. Preferably, this dipped coating is a plastic vinyl which provides three primary functions: first, it functions to seal the entire interior of the body 11 to prevent the buoyant portion 20 from becoming water logged; second, it provides a smooth outer surface to the sinker to make it more snag resistant; and third, it functions to hold all of the body components and the wire together to form a unitary structure. In addition to the existence of the plastic-dip coating 24, the sinker can be painted with one or more colors and/or coats of paint to provide a sinker of desired color. Preferably, the sinker is painted with colors which function to attract fish to the trailing bait.

According to the preferred embodiment, the sinker of the present invention is unitary (i.e., is of one piece) and is of a fixed weight and size. In other words, the sinker of the present invention is free of any means for varying the size or weight of the sinker. Further, the sinker preferably has a body with a solid buoyant portion and a connected weighted portion, with the entire body being relatively rigid and provided with a vinyl or other coating.

FIG. 9 shows an alternate embodiment for the connection end eyelet configuration in which the end 29 of the wire 15 is not embedded in the weighted portion 22. In this embodiment, the fishing line can be more easily connected or disconnected from the sinker.

FIG. 10 illustrates an alternate embodiment of the sinker of the present invention in which the buoyant portion is formed by the sealed air chamber 32 within the plastic or other material member 30. In this embodiment, the lower end of the member 30 is provided with internal threads 31 designed to receive the external threads of a plug portion 35 of the weighted portion 34. An eyelet 38 is provided at the top end of the member 30 and an extending wire 39 is optionally provided at the bottom or free end of the weighted portion 34. The entire structure is then preferably provided with the exterior vinyl or other material layer 36.

Although the preferred embodiment of the sinker includes both a buoyant and a weighted portion, and although the preferred embodiment includes a wire portion 18 extending from the lower end of the sinker body, many benefits of the present invention can also be realized by eliminating these features and using only the unique, elongated and curved sinker configuration as shown. For example, FIG. 13 shows an embodiment in which the sinker is constructed entirely of a weighted metal portion, but which utilizes the elongated and curved configuration of the present invention. In the embodiment if FIG. 13, the magnitude of the curvature and the relationship between the length and width dimensions is the same as that described and shown above.

Figure 14:
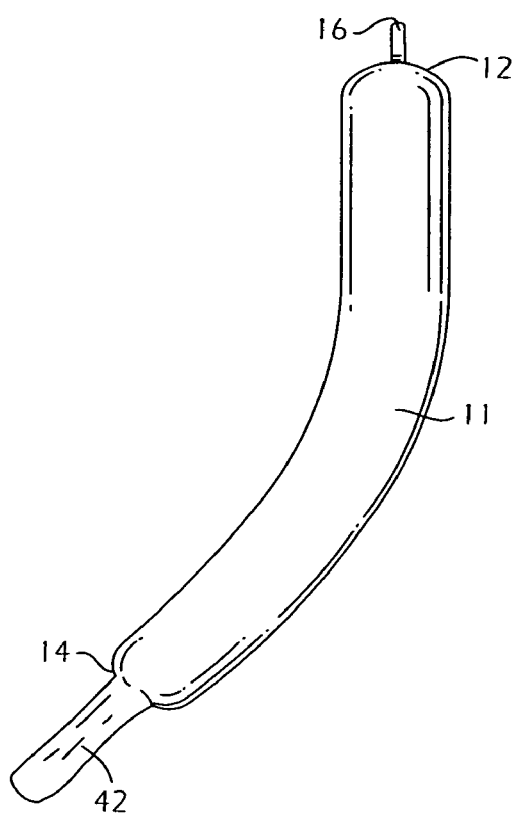
FIG. 14 is an elevational side view of a sinker embodiment with a noise producing element embodied therein.
Figure 15:
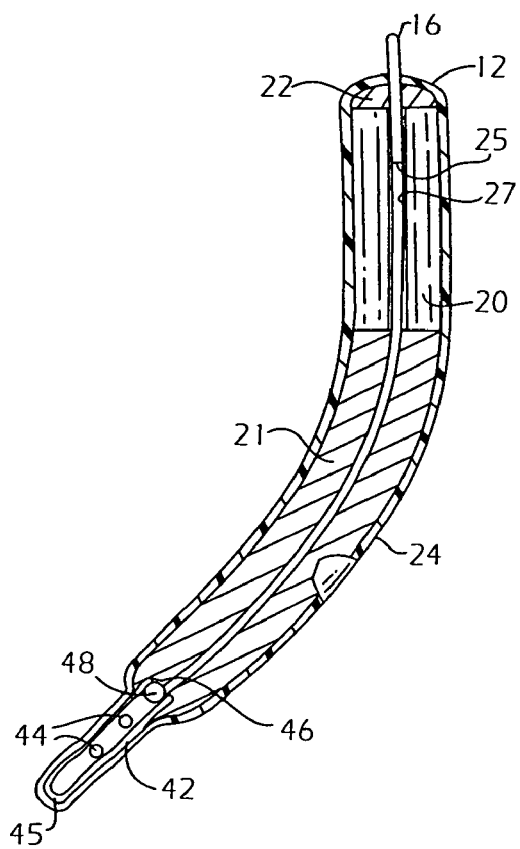
FIG. 15 is a view, partially in section, of the sinker embodiment of FIG. 14.

FIGS. 14 and 15 show a further embodiment of the present invention. Specifically, these figures show a sinker configuration with a noise generating element. Preferably the noise generating element is located at the free end and is comprised of a generally hollow tubular member 42. The member 42 is preferably closed at both ends 45 and 46 and is provided with one or more balls 44 or other object such as a BB within the hollow center portion of the member 42. The ball or balls 44 have a diametrical dimension less than the hollow center of the member 42 to permit the balls 44 to move freely back and forth within the member 42.

Figure 16:
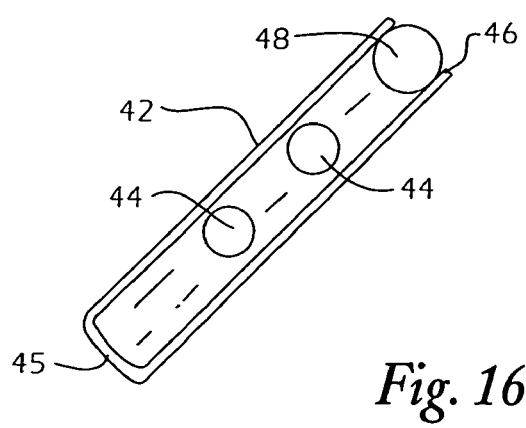
FIG. 16 is a view, partially in section, of the noise generating element in the sinker of the present invention.

As shown best in FIG. 16, the member 42 is preferably molded into the weighted portion 21 at the free end 14 and extends outwardly therefrom along the centerline of the sinker. Because the balls 44 are freely moveable within the hollow center of the member 42, movement of the sinker results in the balls 44 moving back and forth within the member 42. This creates a noise as the balls 44 engage the inner surface of the member 42 which is effective for attracting fish.

Although the member 42 can be constructed of a variety of materials, it is preferably constructed of a metal such as brass or the like. The balls 44 are also preferably constructed of a metal. In the preferred embodiment, the element 42 is constructed as being closed at one end 45 and selectively closed at the other end 46 after the balls 44 have been inserted. Preferably the end 46 is closed by press fitting a ball-like element 48 into the end 46. The end 46 is then molded into the weighted portion 21 as shown so that the member 42 extends outwardly away from the line connection end.

Similar to the other embodiments, the embodiment of FIGS. 14 and 15 is also preferably provided with both a weighted portion 21 and a buoyant portion 20 and an outer coating 24 applied over the entire outer surface of the sinker. In its completed form, the element 42 forms the distal end of the sinker and the wire 18 terminates within the weighted portion 21.

Having described the preferred and alternate embodiments of the sinker, the method of making such a sinker is described as follows. First, a preformed wire such as that illustrated in FIG. 6 is provided. This wire is of a predetermined length and is provided with a line connection loop 16 at one end for connection to the fishing line. As shown in FIG. 7, the loop or connection member 16 can be formed by bending an end portion of the wire 15 in a generally U-shaped configuration so that the end 25 of the wire 15 extends back along the wire 15 as shown. The preformed wire 15 of FIG. 6 includes a distal end 28 which is free of the glass bead and includes two sections "a" and "b". In the preferred embodiment, section "a" is a generally straight section, while section "b" is a generally curved section. Overall, the preformed curve in the wire 15 substantially falls within the final sinker curvature illustrated in FIG. 8 and as described above.

Next, a pre-drilled piece of buoyant material, such as balsa wood, which forms the buoyant portion 20 (FIGS. 2 and 3) is applied to the upper portion "a" of the wire 15. This is done by inserting the distal end 28 of the wire 15 through the center hole 27 drilled or formed through the buoyant portion 20. When inserted, the buoyant portion 20 extends over the end 25.

Next, the wire 15, with the buoyant material 20 applied thereto, is inserted into a mold for casting the antimony/lead or other weighted material to the wire. Preferably this is a silicon mold, although other molds and various molding techniques can be utilized. During this molding step, the two weighted portions 21 and 22 are cast at the same time. Preferably, the weighted portion 22 at the connection end of the body is molded so that the end 25 of the wire 15 is molded into the weighted portion 22. This results in the connection member 16 being comprised of a closed loop. Preferably, the weighted portion 21 is molded so that the bottom, free end 14 of the weighted portion 21 is spaced from the distal end 28 of the wire 15. This results in a portion 18 of the wire 15 extending outwardly from the free end 14 of the sinker body. Preferably, the length of the portion 18 ranges from 10 to 80% of the length of the body 11, and more preferably about 15 to 75% of the length of the body 11. Depending upon the size of the mold cavity relative to the buoyant portion 20, it is possible for some of the weighted material to flow around the edges of the buoyant portion 20 and a limited distance along its sides.

After the weighted portions 21 and 22 have solidified, the sinker is removed from the mold and the glass bead 19 is secured to the distal end 28 of the wire 15. In the preferred process, the glass bead is glued to the distal end 28. The molded sinker is then hung from the glass bead and provided with the finishing dips and coatings. These can comprise one or more vinyl or other material dipping steps for the purpose of providing the coating 24 and one or more dips or applications of paint or finishes as desired. Following the dipping and painting process, the dips and/or paint material is removed from the line connection loop or eyelet 16 to complete manufacture of the sinker.

Alternatively, the wire 15 does not need to be preformed or of predetermined length, nor does it need to be provided with an eyelet at the connection end prior to attachment to the buoyant material or prior to the molding step. Further, the bead 19 can be retained on the wire portion 18 by inserting a bead with a hole onto the wire portion 18 and then swedging or flattening the distal end 28 of the wire portion 18. If this is done, the sinker can be hung by the eyelet during the process of applying the coating 24 and paints. This would eliminate the step of removing coating or paint material from the eyelet 16.

Although the description of the preferred embodiment and process has been quite specific, it is contemplated that various modifications could be made without deviating from the spirit of the present invention. Accordingly, it is intended that the scope of the present invention be dictated by the appended claims rather than by the description of the preferred embodiment.

What is claimed is:

1. A fishing sinker of unitary, one piece construction comprising:
    an elongated body having a line connection end and a free end, said body having a weighted section constructed at least in part of a solid weighted material having a density greater than that of water and being sufficiently weighted to cause the fishing sinker to sink in water, and a noise generating element non-detachably connected with said elongated body at said free end by a non-detachable connection so that the entirety of said weighted section is between said noise generating element and said line connection end and said noise generating element is not removable from said elongated body, said noise generating element comprising a hollow member immovably fixed to said elongated body and a fixed number of noise generating objects moveable freely within said hollow member, the fishing sinker further being free of any means for varying the size or weight of the sinker.

2. The fishing sinker of claim 1 wherein said hollow member is a closed hollow member.

3. The fishing sinker of claim 1 including an exterior dip coating covering substantially the entirety of said body and noise generating element.

4. The fishing sinker of claim 1 wherein said hollow member is constructed of a material different than said weighted material.

5. The fishing sinker of claim 1 wherein said line connection end includes a line connection eyelet.

6. A fishing sinker comprising:

an elongated body having a line connection end and a free end and having a buoyant section and a weighted section, said weighted section constructed of a weighted material having a density greater than that of water and being positioned closer to said free end than said buoyant section, and a noise generating element non-detachably connected with said weighted section both during use and non-use at said free end by a non-detachable connection between said noise generating element and said weighted section so that said weighted section is between said buoyant section and said noise generating element, said noise generating element comprising a closed hollow member and a fixed number of noise generating objects moveable freely within said hollow member, said number of noise generating objects being fixed both during use and non-use, the fishing sinker further being free of any means for varying the size or weight of the sinker.

7. The fishing sinker of claim 6 wherein said hollow member is constructed of metal.

8. The fishing sinker of claim 6 wherein said noise generating objects including two or more noise generating balls moveable freely within said hollow member.

9. The fishing sinker of claim 1 wherein said weighted section is comprised of a molded metal and said noise generating element is molded into said weighted section.

10. The fishing sinker of claim 9 including an exterior plastic seal coating covering substantially the entirety of said body and noise generating element.

11. The fishing sinker of claim 1 including a wire extending substantially through the entirety of said body wherein said wire has an end defining said line connection end.

12. The fishing sinker of claim 1 including an exterior dip coating covering substantially the entirety of said body and noise generating element.

13. The fishing sinker of claim 1 wherein said hollow member is constructed of a material different than said weighted material.

14. The fishing sinker of claim 6 having a unitary construction.

15. The fishing sinker of claim 6 wherein said line connection end includes a line connection eyelet.

16. The fishing sinker of claim 6 wherein said weighted section is sufficiently weighted to cause the fishing sinker to sink in water.

17. A fishing sinker construction comprising:

a body having a line connection end and an opposite free end, said body having a weighted section located at said free end, constructed at least in part of a solid weighted material comprising a lead based material, having a density greater than that of water and being sufficiently weighted to cause the fishing sinker to sink in water; and a noise generating element comprising a hollow member with first and second ends, said first end being molded into said weighted section at said free end and said second end extends outwardly from said free end to define a closed, noise generating chamber which is non-detachable from said weighted section both during use and non-use and wherein said hollow member is constructed of a rigid metal different from said weighted section; and a fixed number of noise generating objects contained within said chamber, said noise generating objects being sufficiently small so that they are moveable freely within said chamber.

18. The fishing sinker of claim 17 including a continuous dip coating covering the entirety of the fishing sinker including said body and said noise generating element.

* * * * *